US011981532B2

(12) United States Patent
Watari et al.

(10) Patent No.: US 11,981,532 B2
(45) Date of Patent: May 14, 2024

(54) PAPER SUPPLY DEVICE

(71) Applicant: RISO KAGAKU CORPORATION, Tokyo (JP)

(72) Inventors: Kyosuke Watari, Ibaraki (JP); Ryo Terakado, Ibaraki (JP); Masashi Hara, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 256 days.

(21) Appl. No.: 17/570,072

(22) Filed: Jan. 6, 2022

(65) Prior Publication Data

US 2022/0227594 A1 Jul. 21, 2022

(30) Foreign Application Priority Data

Jan. 15, 2021 (JP) ................................ 2021-005371

(51) Int. Cl.

| | |
|---|---|
| ***B65H 7/18*** | (2006.01) |
| ***B41J 3/60*** | (2006.01) |
| ***B41J 13/00*** | (2006.01) |
| ***B65H 7/02*** | (2006.01) |

(52) U.S. Cl.

CPC .................. *B65H 7/18* (2013.01); *B41J 3/60* (2013.01); *B41J 13/0018* (2013.01); *B65H 7/02* (2013.01); *B65H 2301/333* (2013.01); *B65H 2301/35* (2013.01); *B65H 2301/4452* (2013.01); *B65H 2513/51* (2013.01); *B65H 2513/512* (2013.01); *B65H 2801/24* (2013.01)

(58) Field of Classification Search

CPC ... B65H 7/00; B65H 7/02; B65H 7/18; B65H 2301/333; B65H 2301/35; B65H 2301/351; B65H 2301/4452; B65H 2301/44522; B65H 2511/22; B65H 2513/51; B65H 2801/24; B41J 3/60; B41J 13/0018

See application file for complete search history.

(56) References Cited

U.S. PATENT DOCUMENTS

| | | | | |
|---|---|---|---|---|
| 5,664,771 A * | 9/1997 | Nagatani .................. | G07B 3/04 | 271/265.02 |
| 6,554,125 B1 * | 4/2003 | Honegger ............ | B65H 29/669 | 271/271 |
| 2009/0127775 A1 * | 5/2009 | Takahashi .............. | B65H 29/00 | 271/225 |

(Continued)

FOREIGN PATENT DOCUMENTS

| | | |
|---|---|---|
| JP | 2014-073630 | 4/2014 |

*Primary Examiner* — Prasad V Gokhale
(74) *Attorney, Agent, or Firm* — GREENBLUM & BERNSTEIN, P.L.C.

(57) ABSTRACT

A paper supply device is equipped with a paper supply unit that sequentially supplies a plurality of print media, and a control unit that controls the paper supply unit. During sequential supply of a plurality of print media at a paper supply interval, in the case that it is necessary to secure a paper supply interval which is set in advance and is longer than the paper supply interval, a reference paper supply interval, based on a point in time which is a natural number multiple of the paper supply interval, and a post print process paper supply interval are compared. Print media are supplied at the post print process paper supply interval in the case that the post print process paper supply interval and the reference paper supply interval are different.

5 Claims, 12 Drawing Sheets

(56) References Cited

U.S. PATENT DOCUMENTS

| | | | | |
|---|---|---|---|---|
| 2009/0278304 | A1* | 11/2009 | Hara | B65H 7/02 271/265.01 |
| 2011/0248439 | A1* | 10/2011 | Oshima | G03G 15/607 271/3.16 |
| 2014/0098154 | A1* | 4/2014 | Fujimoto | B41J 3/60 347/16 |

* cited by examiner

PAPER SUPPLY DEVICE

CROSS-REFERENCE TO RELATED APPLICATIONS

The present application claims priority under 35 U.S.C. § 119 to Japanese Patent Application No. 2021-005371, filed on Jan. 15, 2021. The above application is hereby expressly incorporated by reference, in its entirety, into the present application.

BACKGROUND OF THE INVENTION

1. Field of the Invention

The present disclosure is related to a paper supply device that sequentially supplies a plurality of print media.

2. Description of the Related Art

Conventionally, printing systems in which a post print processing apparatus is connected at the downstream side of a printing apparatus to administer various post print processes on printed sheets on which a printing process has been administered by the printing apparatus have been proposed. Examples of post print processes include a stapling process and a hole punching process, for example.

In the case that a post print process is administered on printed sheets by such a printing system, an amount of time corresponding to the contents of processing will be required at the post print processing apparatus. Therefore, when the printed sheets are delivered from the printing apparatus to the post print apparatus, it is necessary to secure the aforementioned amount of time that corresponds to the contents of processing. However, there is a possibility that productivity will deteriorate if the amount of time which is taken to deliver the printed sheets to the post print apparatus from the printing apparatus becomes excessively long.

Meanwhile, printing apparatuses that perform double sided printing are also employed as a printing apparatus which is connected to the aforementioned post print processing apparatus. As a printing apparatus that performs double sided printing, that which administers a printing process on one side of a printing sheet which is supplied by a paper supply unit of the printing apparatus, inverts the printing sheet of which one side has been printed on with an inverting unit, and then administers a printing process on the other side of the inverted printing sheet is being proposed.

In such a printing apparatus that performs double sided printing, a method that inserts a single side printed sheet which has been inverted by an inverting unit between printing sheets which are supplied by the paper supply unit is being proposed in order to improve productivity. That is, during double sided printing, a printing sheet feeding time Tp for a single printing sheet and a sheet interval Tg between a first printing sheet and a second printing sheet which are supplied from the paper supply unit are secured, and then a single side printed sheet which has been inverted by the inverting unit is inserted during the sheet feeding time Tp, as illustrated in FIG. 4.

SUMMARY OF THE INVENTION

Here, in the aforementioned printing apparatus that performs double sided printing as well, it is necessary to conduct paper supply taking a post print processing time into consideration in the case that a post print processing device is connected and post print processes are performed.

For example, Japanese Unexamined Patent Publication No. 2014-73630 proposes a method in which a sheet interval Tg is adjusted to match an amount of post print processing time to be performed on each printing sheet, in the case that a post print processing device is connected and post print processes are performed.

However, there are cases in which post print processes are not only performed on each printed sheet as disclosed in Japanese Unexamined Patent Publication 2014-73630, but on a set of sheets constituted by a plurality of printed sheets. For example, there are cases in which each printed sheet undergoes a sheet aligning process as a post print process, and then a stapling process is performed between sets of sheets.

In such a case, it is necessary to secure a post print processing time for the stapling process which is performed between the sets of sheets. In Japanese Unexamined Patent Publication No. 2014-73630, the sheet interval Tg is adjusted to match the post print processing time of the sheet aligning process, and secures an amount of post processing time as a natural number multiple of (sheet feeding time Tp+sheet interval Tg)·2=Tb, as illustrated in FIG. 12, for example.

However, in the case that the supply timing of a first printing sheet of a subsequent set of sheets is determined as a natural number multiple of Tb as described above, there may be cases in which a paper supply interval (Ts) from a paper supply timing t0 of the last sheet of a first set to a time t1 at which the stapling process is actually completed, and a paper supply interval, which is a natural number multiple of Tb, will deviate, as illustrated in FIG. 12. In such cases, production deteriorates for the loss time (Tloss) illustrated in FIG. 12. Note that the example illustrated in FIG. 12 is for a case in which a first set of sheets is constituted by two printed sheets.

The present disclosure has been developed in view of the foregoing circumstances. The present disclosure provides a paper supply device which is capable of taking an amount of post print processing time into consideration when exerting control of paper supply, without causing productivity to deteriorate.

A paper supply device of the present disclosure is equipped with a paper supply unit that sequentially supplies a plurality of print media, and a control unit that controls the paper supply unit. During sequential supply of a plurality of print media at a first paper supply interval, in the case that it is necessary to secure a second paper supply interval which is longer than the first paper supply interval and set in advance, the control unit compares a third paper supply interval, based on a point in time which is a natural number multiple of the first paper supply interval, and the second paper supply interval, and causes the paper supply unit to supply paper at the second paper supply interval in the case that the second paper supply interval and the third paper supply interval are different.

According to the paper supply device of the present disclosure, during sequential supply of a plurality of print media at a first paper supply interval, in the case that it is necessary to secure a second paper supply interval which is longer than the first paper supply interval (and is set in advance a paper supply interval until a point in time at which a post print process is completed, for example), the control unit compares a third paper supply interval, based on a point in time which is a natural number multiple of the first paper supply interval, and the second paper supply interval, and causes the paper supply unit to supply paper at the second paper supply interval in the case that the second paper supply interval and the third paper supply interval are different. Therefore, in the case that a post print process is to be performed after double sided printing as illustrated in FIG. 12, the loss time Tloss can be prevented from being generated by initiating supply of the first printing sheet of the second set at the point in time t1 at which the stapling process is completed. Therefore, paper supply control that takes a post print processing time into consideration can be conducted without resulting in a deterioration of productivity.

DETAILED DESCRIPTION OF THE INVENTION

Figure 1:
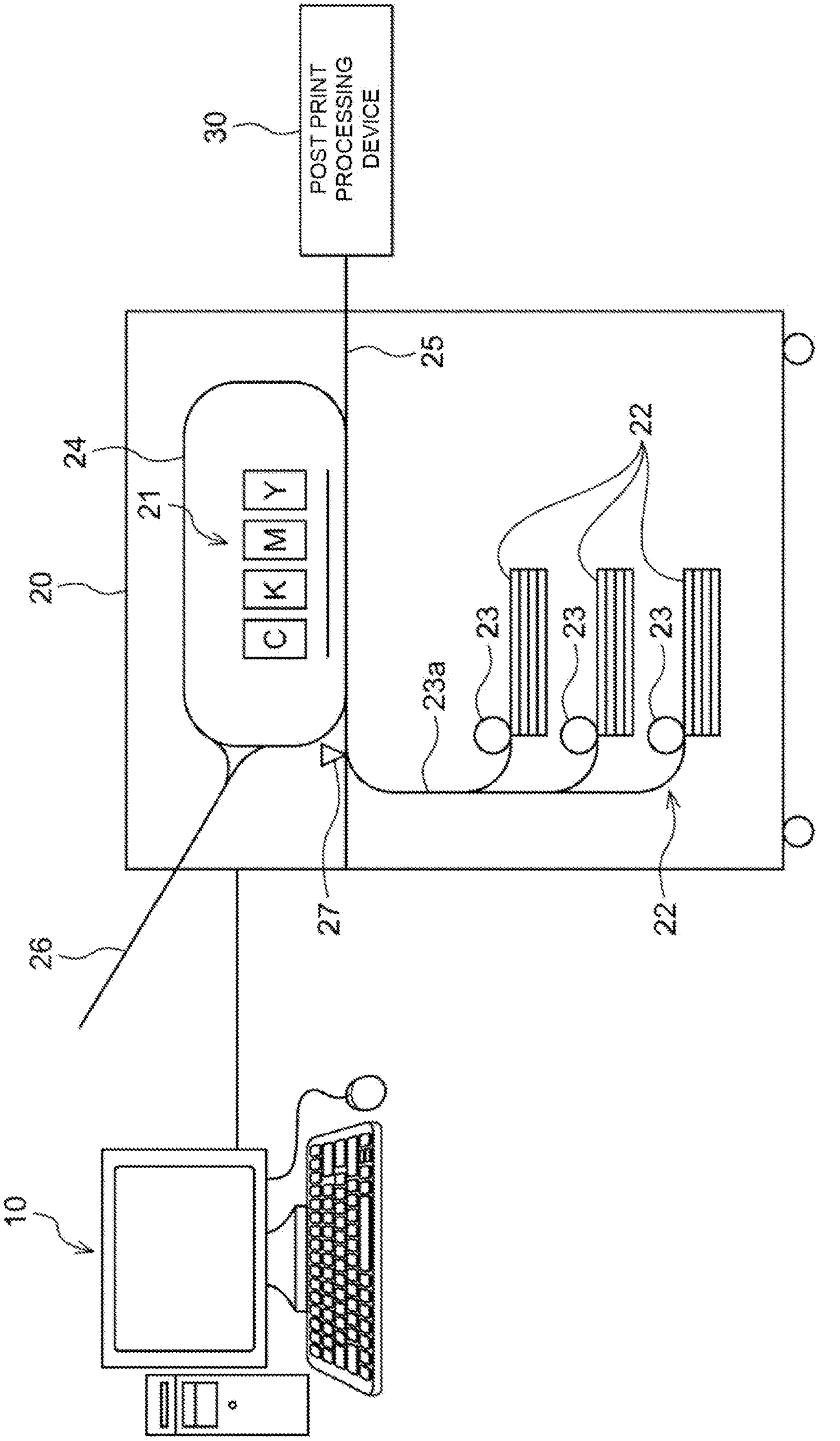
FIG. 1 is a diagram that illustrates the schematic configuration of a printing system that employs an embodiment of the paper supply device of the present disclosure.

A printing system that employs an embodiment of the paper supply device of the present disclosure will be described in detail with reference to the drawings. The printing system of the present embodiment is characterized by the method by which paper supply timings are controlled in the paper supply device. However, the configuration of the entire system will be described first. FIG. 1 is a diagram that illustrates the schematic configuration of a printing system 1 of the present embodiment.

As illustrated in FIG. 1, the printing system 1 of the present embodiment is equipped with a computer 10, a printing apparatus 20, and a post printing processing device 30.

The computer 10 and the printing apparatus 20 are connected by a communication circuit. The communication circuit may be an Internet connection, a LAN (Local Area Network), or a telephone circuit. In addition, the communication circuit may be wired or wireless.

The computer 10 is configured to be capable of editing image data to be printed onto printing sheets. A printer driver for the printing apparatus 20 is installed in the computer 10. The computer 10 generates print job data that includes image data, and outputs the generated print job data to the printing apparatus 20. The print job data includes information that indicates double sided printing or single sided printing, information that indicates a sheet size, and information that indicates the contents of a post print process, in addition to the aforementioned image data.

The printing apparatus 20 administers a printing process on a printing sheet based on the print job data output from the computer 10. The printing apparatus 20 is equipped with an ink head unit 21 that ejects ink onto the printing sheet. The ink head unit 21 administers the printing process by ejecting ink onto the printing sheet based on the image data which is included in the print job data output from the computer 10. The ink head unit 21 of the present embodiment is equipped with a plurality of line shaped ink heads that eject black K, cyan C, magenta M, and yellow Y ink.

In addition, the printing apparatus 20 is equipped with a paper supply tray 22 on which printing sheets are placed, and a paper supply unit 23 that removes the printing sheets from the printing tray 22 and supplies the printing sheets. Printing sheets of various sheet types and sheet sizes are placed on the paper supply tray 22. When a printing process is performed by the printing apparatus 20, the printing sheets placed on the paper supply tray 22 are picked up by the paper supply unit 23 which is equipped with a pick up roller or the like, and supplied to a circulating conveyance path 24.

In addition, the printing apparatus 20 is equipped with the circulating conveyance path 24 along which the printing sheets supplied by the paper supply unit 23 are conveyed. The circulating conveyance path 24 is constituted by conveyance rollers and conveyor belts, and conveys the printing sheets supplied by the pepr supply tray 22 from an upstream side to a downstream side of the ink head unit 21.

In addition, the circulating conveyance path 24 feeds a printing sheet, on one side of which a printing process has been administered by the ink head unit 21, to the post print processing device 30 via a communication path 25 in the case of single sided printing. In the case of double sided printing, the circulating conveyance path 24 conveys a printing sheet, on one side of which a printing process has been administered, to an inverting unit 26. The inverting unit 26 inverts the printing sheet, and the single side printed printing sheet is conveyed form the upstream side to the downstream side of the ink head unit 21 again. Thereafter, a double side printed printing sheet, on which a printing process has been administered again, is fed to the post print processing device 30 via the communication path 25.

In addition, a paper supply conveyance path 23_a_ conveys the printing sheet supplied by the paper supply unit 23 to the circulating conveyance path 24. A resist sensor 27 is provided in the vicinity of a point at which the paper supply conveyance path 23*a* and the circulating conveyance path 24 meet. The resist sensor 27 is an optical sheet detecting sensor, and detects whether a print medium is passing the position of the resist sensor 27. Note that the resist sensor 27 corresponds to a detecting unit of the present disclosure.

Detection signals from the resist sensor 27 are output to a control unit 28 to be described later. The control unit 28 controls paper supply timings by controlling the paper supply unit 23 based on the detection signals input thereto. Control of the paper supply timings based on the detection signals from the resist sensor 27 will be described later. Control of paper supply intervals by the control unit 28 to be described later is based on the detection signals from the resist sensor 27. That is, in the present embodiment, a point in time at which the front surface or the back surface of a print medium passes a predetermined position is a point in time at which a printing sheet passes the resist sensor 27, and the paper supply intervals are intervals among points in time at which printing sheets pass the resist sensor 27.

The post print processing device 30 administers predetermined post print processes on printed sheets received from the printing apparatus 20. Examples of post print processes which are performed by the post print processing device 30 include a stapling process that staples a plurality of printed sheets together, an offsetting process that offsets printed sheets in units of sets of printed sheets and discharges the offset sets of printed sheets to a paper discharge tray, a hole punching process that punches holes in printed sheets, a folding process that folds printed sheets in thirds or halves, and a bookbinding process that binds printed sheets into books. In addition to the post print processes described above which are administered on sets of printed sheets, there are post processes which are conducted on each printed sheet within a set, such as a sheet aligning process. Note that known mechanisms may be utilized as the specific mechanisms for performing these post print processes, and detailed descriptions thereof will be omitted here.

Next, a control system of the printing system 1 of the present embodiment will be described with reference to FIG. 2.

Figure 2:
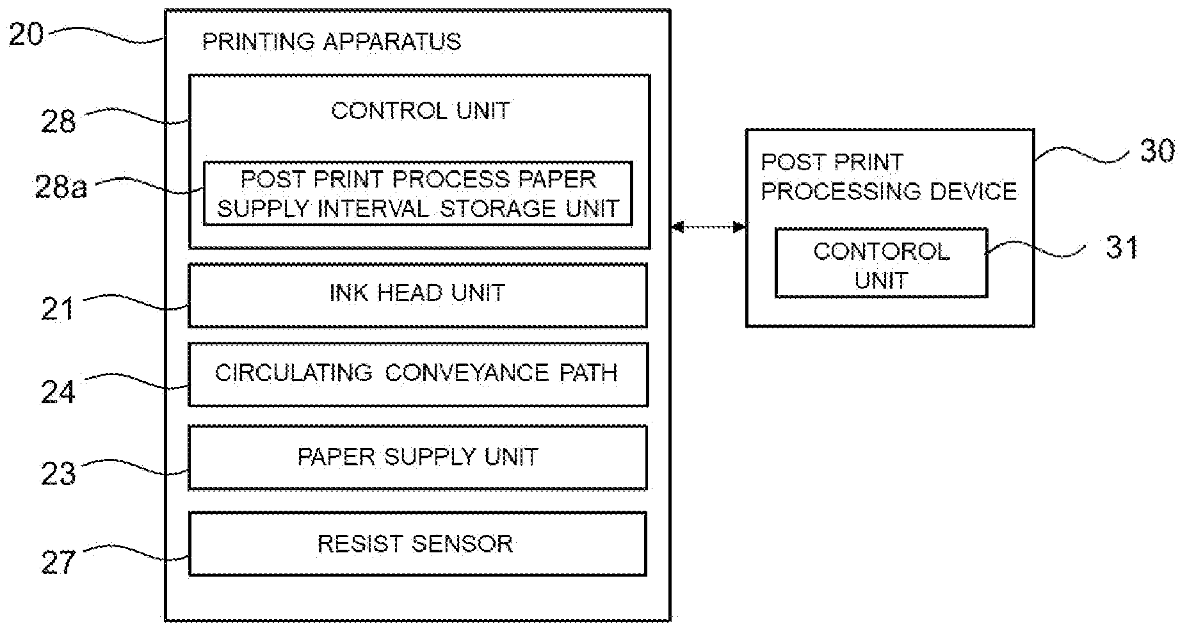
FIG. 2 is a block diagram that illustrates the schematic configuration of a control system of the printing system illustrated in FIG. 1.

As illustrated in FIG. 2, the printing apparatus 20 is equipped with the control unit 28 that controls the entire printing apparatus 20. The control unit 28 controls the paper supply timings for printing sheets of the paper supply unit 23, conveyance of the printing sheets by the circulating conveyance path 24, ejection of ink from the ink head unit 21, etc.

In addition, the control unit 28 is equipped with a post print process paper supply interval storage unit 28*a*, in which post print process paper supply intervals which are calculated in advance based on post print processing times at the post print processing device 30 are recorded. In the case that a post print process is to be performed by the post print processing device 30, the control unit 28 reads out the post print process paper supply interval which is recorded in the post print process paper supply interval storage unit 28*a* and controls the paper supply timing. The method by which the paper supply timing is controlled will be described in detail later.

Next, the operation of the printing system 1 of the present embodiment will be described. Note that the printing system 1 of the present embodiment is characterized by the method by which the paper supply timing of printing sheets at the printing apparatus 20 is controlled. Therefore, a description will be given mainly regarding this point below.

The printing system 1 of the present embodiment is capable of single sided printing and double sided printing, and is capable of administering post print processes on printed sheets obtained by single sided printing and double sided printing, respectively. That is, there are four printing conditions in the printing system 1 of the present embodiment, which are "single sided printing, without post print process", "double sided printing, without post print process", "single sided printing, with post print process", and "double sided printing, with post print process". The printing system 1 of the present embodiment is characterized by the paper supply timing for a case in which the printing conditions are "double sided printing, with post print process". However, in order to facilitate understanding, paper supply control by the printing apparatus 20 for all of the four printing conditions above will be respectively described.

Figure 3:
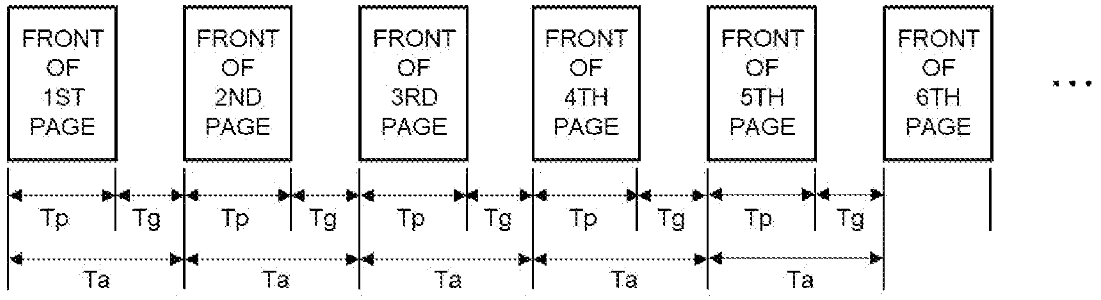
FIG. 3 is a diagram that illustrates an example of a paper supply control operation which is conducted in the case that printing conditions are "single sided printing, without post print process".

First, in the case that the printing conditions are "single sided printing, without post print process", control is exerted such that the paper supply unit 23 supplies each printing sheet at a paper supply interval Ta, as illustrated in FIG. 3. The paper supply interval Ta is an interval which is the sum of a sheet feeding time Tp and a sheet interval Tg. The sheet feeding time Tp is a value which is the length of a single printing sheet in a conveyance direction divided by a conveyance speed along the circulating conveyance path 24. This amount of time is set based on the information regarding sheet size which is included in the print job data.

In addition, the sheet interval Tg is a sheet interval which is set in advance. In the present embodiment, the sheet interval Tg is set to the minimal interval at which printing sheets do not collide with each other in the case that the printing conditions are "single sided printing, without post print process".

Figure 4:
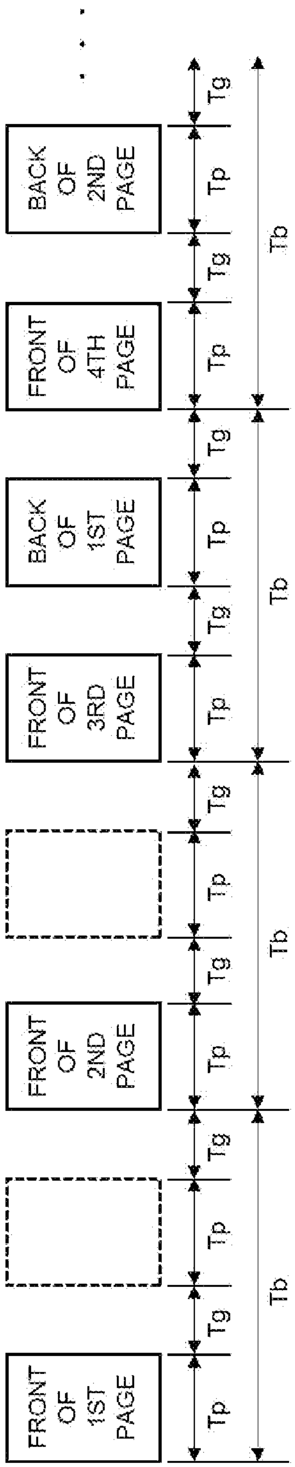
FIG. 4 is a diagram that illustrates an example of a paper supply control operation which is conducted in the case that printing conditions are "double sided printing, without post print process".

Next, in the case that the printing conditions are "double sided printing, without post print process" control is exerted such that the paper supply unit 23 supplies each printing sheet at a paper supply interval Tb, as illustrated in FIG. 4. The paper supply interval Tb is an interval which is two times the paper supply interval Ta for the case that the printing conditions are "single sided printing, without post print process". The sheet feeding time Tp and the sheet intervals Tg prior to and following the sheet feeding time are secured between the printing sheets which are supplied by the paper supply unit 23. A single side printed sheet, which has been inverted by the inverting unit 26 of the circulating conveyance path 24, is inserted and conveyed during the sheet feeding time Tp. That is, the present embodiment alternately performs paper supply of unprinted printing sheets from the paper supply unit 23 and paper supply of single side printed sheets from the inverting unit 26 of the circulating conveyance path 24 in the case of double sided printing.

Figure 5:
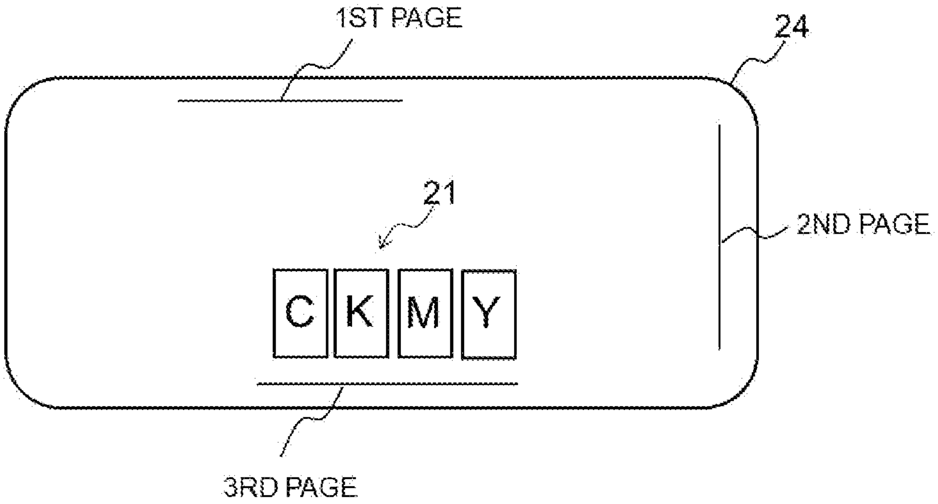
FIG. 5 is a diagram that illustrates an example of a conveyance state of a printing sheet along a circulating conveyance path during conveyance for double sided printing.

Note that as illustrated in FIG. 5, in the present embodiment, two printing sheets (the first printing sheet and the second printing sheet) are conveyed along the circulating conveyance path 24 above in addition to a printing sheet immediately under the ink head unit 21 (the third printing sheet). That is, the circulating conveyance path 24 is configured to be capable of conveying a total of three printing sheets simultaneously. Accordingly, as illustrated in FIG. 4 and FIG. 5 the first single side printed sheet (back surface of the first sheet) is inserted immediately after the third unprinted printing sheet (front surface of the third sheet) is supplied by the paper supply unit 23, and the second single side printed sheet (back surface of the second sheet) is inserted immediately after fourth unprinted printing sheet (front surface of the fourth sheet) is supplied by the paper supply unit 23. That is, the present embodiment is configured such that an n−2nd single side printed sheet is inserted immediately after an nth printing sheet is supplied by the paper supply unit 23. Note that the rectangles illustrated by the dotted lines in FIG. 4 indicate intervals in which printing sheets are not actually conveyed, although amounts of time which are the sheet feeding time Tp and the sheet intervals Tg prior to and following the sheet feeding time are secured.

Next, paper supply control in the case that the printing conditions are "double sided printing, with post print process" will be described. Here, paper supply control in the case that 10 double side printed sheets constitute one set of sheets, a sheet aligning process is performed for each printing sheet, and a stapling process is performed for each set of sheets will be described. That is, paper supply control for a case in which the paper aligning process is performed between each printing sheet, and the stapling process is performed between each set of sheets will be described.

Figure 6:
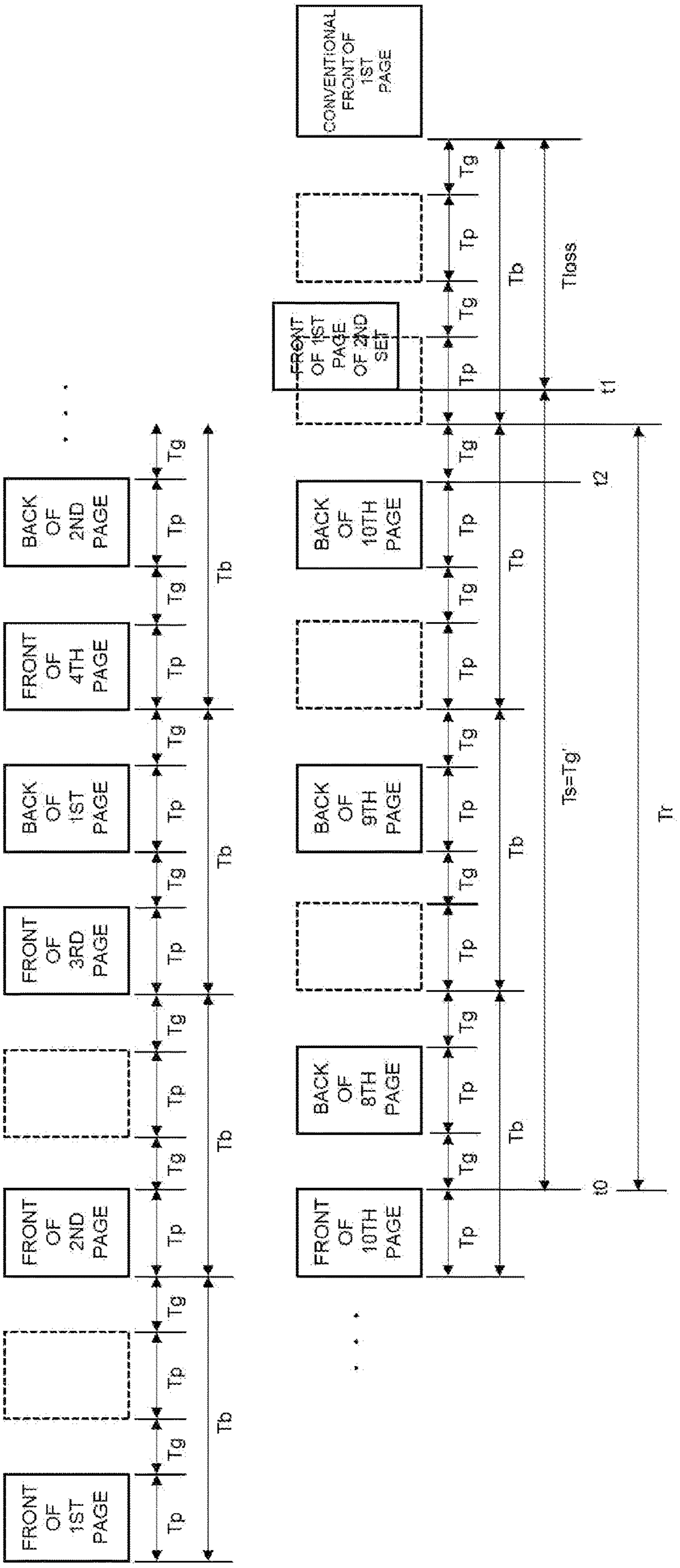
FIG. 6 is a diagram that illustrates an example of a paper supply control operation which is conducted in the case that printing conditions are "double sided printing, with post print process".

As illustrated in FIG. 6, the control unit 28 controls the paper supply unit 23 to supply each printing sheet at a paper supply interval Tb for the front surface of a first printing sheet to the front surface of a 10th printing sheet in the same manner as the case in which the printing conditions are "double sided printing, without post print process" illustrated in FIG. 4 with respect to a first set of sheets. Note that the sheet interval Tg is adjusted to match the amount of time required for the sheet aligning process, which is the post print process performed on each printing sheet.

Here, in the case that the stapling process is performed between sets of sheets, if the paper supply timing of the first printing sheet of a second set is simply set to a natural number multiple of (Tp+Tg)·2=Tb, the paper supply timing will be that of the "Conventional Front of First Page" indicated in FIG. 6. However, if the point in time at which the stapling process is completed for the first set of sheets is time t1 indicated in FIG. 6, the loss time Tloss indicated in FIG. 6 will be generated, resulting in a deterioration of productivity. Therefore, in the present embodiment, the paper supply timing is controlled such that the aforementioned loss time Tloss is not generated.

Figure 7:
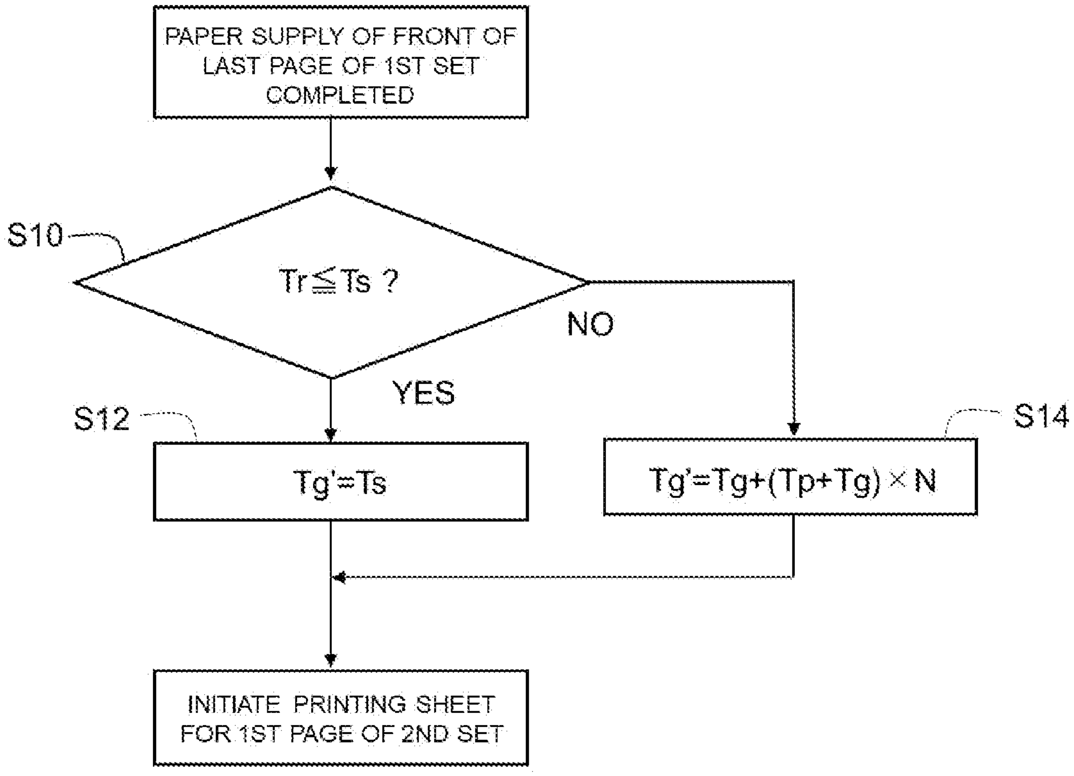
FIG. 7 is a flow chart for explaining a method for determining the paper supply timing of the first sheet of a second set of sheets.

Specifically, the control unit 28 determines the paper supply timing of the first printing sheet of the second set of sheets according to the flow chart illustrated in FIG. 7.

First, the control unit reads out a post print process paper supply interval Ts from the post print process paper supply interval storage unit 28*a*. The post print process paper supply interval Ts is an amount of time from a point in time (t0 indicated in FIG. 6) at which paper supply of the printing sheet for the last page of the first set of sheets (front of 10th page) is completed to a point in time (t1 indicated in FIG. 6) at which the stapling process for the first set of sheets is completed, and is recorded in the post print process paper supply interval storage unit 28*a*.

The post print process paper supply interval Ts is a paper supply interval which is set based on an amount of post print processing time having a start point after the last page of the first set of sheets is discharged and an endpoint when the post print process is completed. The paper supply interval Ts is set such that printing sheets for a next set of sheets are not fed to the post print processing device 30 while the post print processing device 30 is performing a post print process. The post print process paper supply interval Ts corresponds to a paper supply interval that corresponds to an amount of time of the post print process of the present disclosure.

Next, the control unit 28 calculates a reference paper supply interval Tr, which is the sum of an amount of time from the point in time (t0) at which paper supply of the last page of the first set of sheets (front of 10th page) is completed to a point in time (t2) at which paper supply of the back surface of the printing sheet of the last page (back of 10th page) is completed and the sheet interval Tg, and then the post print process paper supply interval Ts and the standard paper supply interval Tr are compared (S10). Note that the comparison of the post print process paper supply interval Ts and the reference paper supply interval Tr is practically a judgment regarding whether a printing sheet is present on the circulating conveyance path 24 at the point in time that the stapling process for the first set of sheets is completed. In addition, in the present embodiment, the paper supply interval Tb corresponds to the first paper supply interval of the present disclosure, the post print process paper supply interval Ts corresponds to the second paper supply interval of the present disclosure, and the reference paper supply interval Tr corresponds to the third paper supply interval of the present disclosure.

In the case that the post print process paper supply interval Ts is of a length which is greater than or equal to the reference paper supply interval Tr (S10: YES), that is, a printing sheet is not present on the circulating conveyance path 24 at the point in time t1 that the stapling process for the first set of sheets is completed, the control unit 28 sets a paper supply interval Tg' for the first printing sheet of the second set of sheets as the post print process paper supply interval Ts (S12) as illustrated in FIG. 6. This is because there will be no problem if paper supply of the first printing sheet of the second set of sheets is initiated at the point in time that the stapling process for the first set of sheets is completed.

Figure 8:
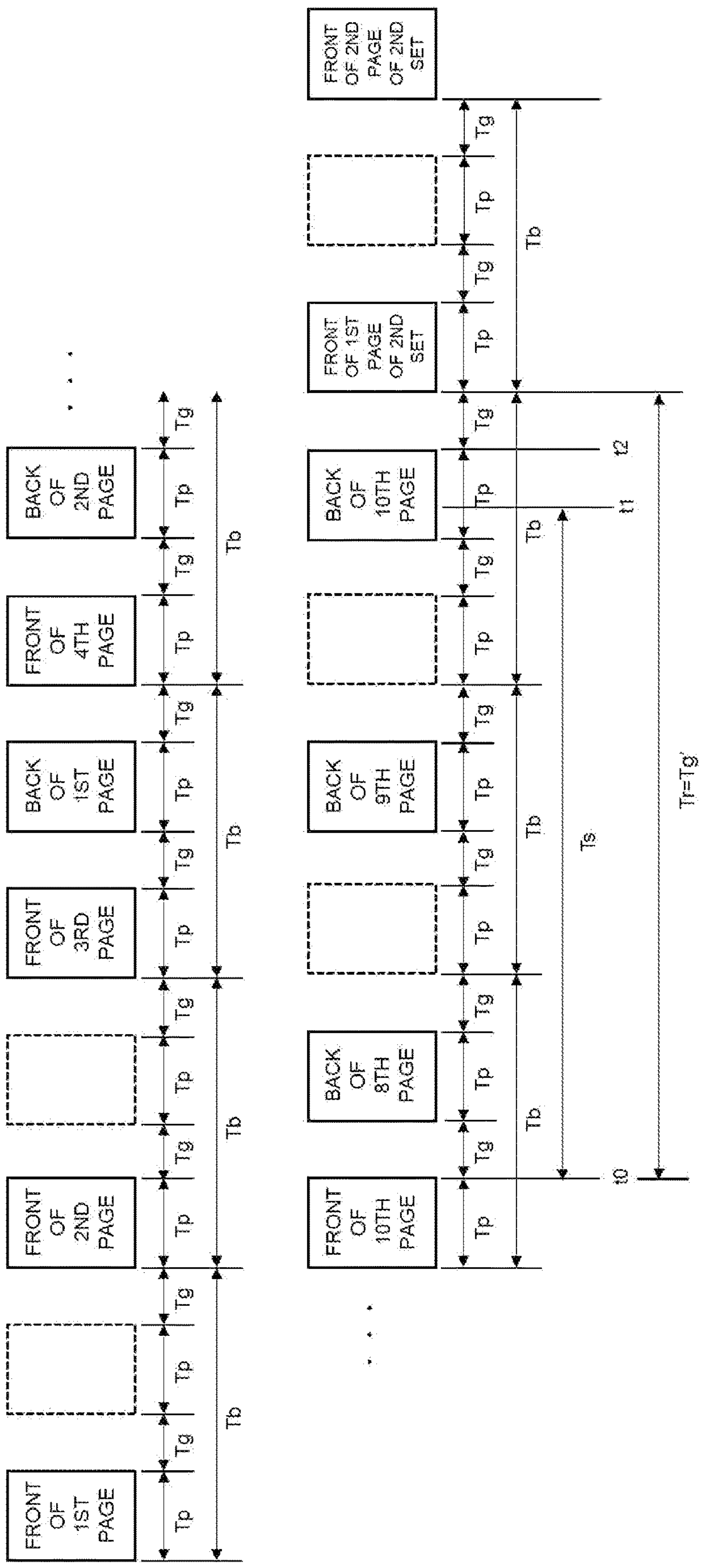
FIG. 8 is a diagram that illustrates another example of a paper supply control operation which is conducted in the case that printing conditions are "double sided printing, with post print process".

Meanwhile, in the case that the post print process paper supply interval Ts is of a length which is less than the reference paper supply interval Tr (S10: NO), that is, a printing sheet is still present on the circulating conveyance path 24 at the point in time t1 that the stapling process for the first set of sheets is completed, the control unit 28 sets the paper supply interval Tg' for the first printing sheet of the second set of sheets to {Tg+(Tp+Tg)·N (S14), as illustrated in FIG. 8. This is to prevent the printing sheet which is present on the circulating conveyance path 24 from colliding with the first printing sheet of the second set of sheets. Note that N is the smallest odd number by which Tg' becomes longer than Ts.

Next, the control unit 28 employs the paper supply interval Tg' which was set in S12 or S14, and initiates paper supply of the first printing sheet of the second set of sheets from the paper supply unit 23. Thereafter, the second and subsequent sheets of the second set of sheets are supplied at the paper supply interval Tb.

According to the printing system 1 of the embodiment described above, the reference paper supply interval Tr and the post print process paper supply interval Ts are compared. In the case that the post print process paper supply interval Ts is greater than or equal to the reference paper supply interval Tr as illustrated in FIG. 6, the first sheet of the second set of sheets is supplied at the post print process paper supply interval Ts. Therefore, the generation of loss time Tloss can be prevented, and paper supply control that takes the post print processing time into consideration without resulting in deterioration of productivity can be conducted.

In addition, in the printing system 1 of the embodiment described above, in the case that the post print process paper supply interval Ts is shorter than the reference paper supply interval Tr as illustrated in FIG. 8, paper supply is performed at the reference paper supply interval Tr. Therefore, the first printing sheet of the second set of sheets can be supplied without the printing sheet of the last page of the first set of sheets (back of 10th page) and the first printing sheet of the second set of sheets colliding.

Note that in the case that the printing conditions are "single sided printing, with post print process", the sheet interval Tg illustrated in FIG. 3 is adjusted to match the amount of post print processing time required for each printing sheet, and each printing sheet is supplied from the paper supply unit 23, for example. In addition, the present disclosure is also applicable to the case of "single sided printing, with post print process". For example, in the case that paper is supplied from the paper supply unit 23 at the paper supply interval Ta as illustrated in FIG. 3, there may be cases in which the amount of time until a point in time (third paper supply interval) at which the first sheet of a second set of sheets is supplied after the last page of a first set of sheets is supplied at a natural number multiple of the paper supply interval Ta will be later than a point in time at which the post print process is completed. That is, there may be cases in which a post print process paper supply period (second paper supply period) that corresponds to the amount of time required for the post print process are shorter than a paper supply period (third paper supply period) that corresponds to the natural number multiple of the paper supply interval Ta. In this case as well, setting the paper supply timing of the first printing sheet of the second set of sheets to match the point in time at which the post print process is completed will prevent the generation of loss time, and can improve productivity.

Next, a modification of the paper supply timing in the case that the printing conditions are "double sided printing, with post print process" will be described. In the embodiment described above, in the example illustrated in FIG. 6, for example, it is presumed that the printing sheet of the last page of the first set of sheets (back of 10th sheet) is already out of the circulating conveyance path 24, and the paper supply timing Tg' of the first printing sheet of the second set of sheets is set to the post print process paper supply interval Ts. However, in the case that a printing sheet of the last page of the first set of sheets is not conveyed on schedule and a conveyance delay occurs, the printing sheet of the last page of the first set of sheets (back of 10th sheet) and the first printing sheet of the second set of sheets will collide.

Figure 9:
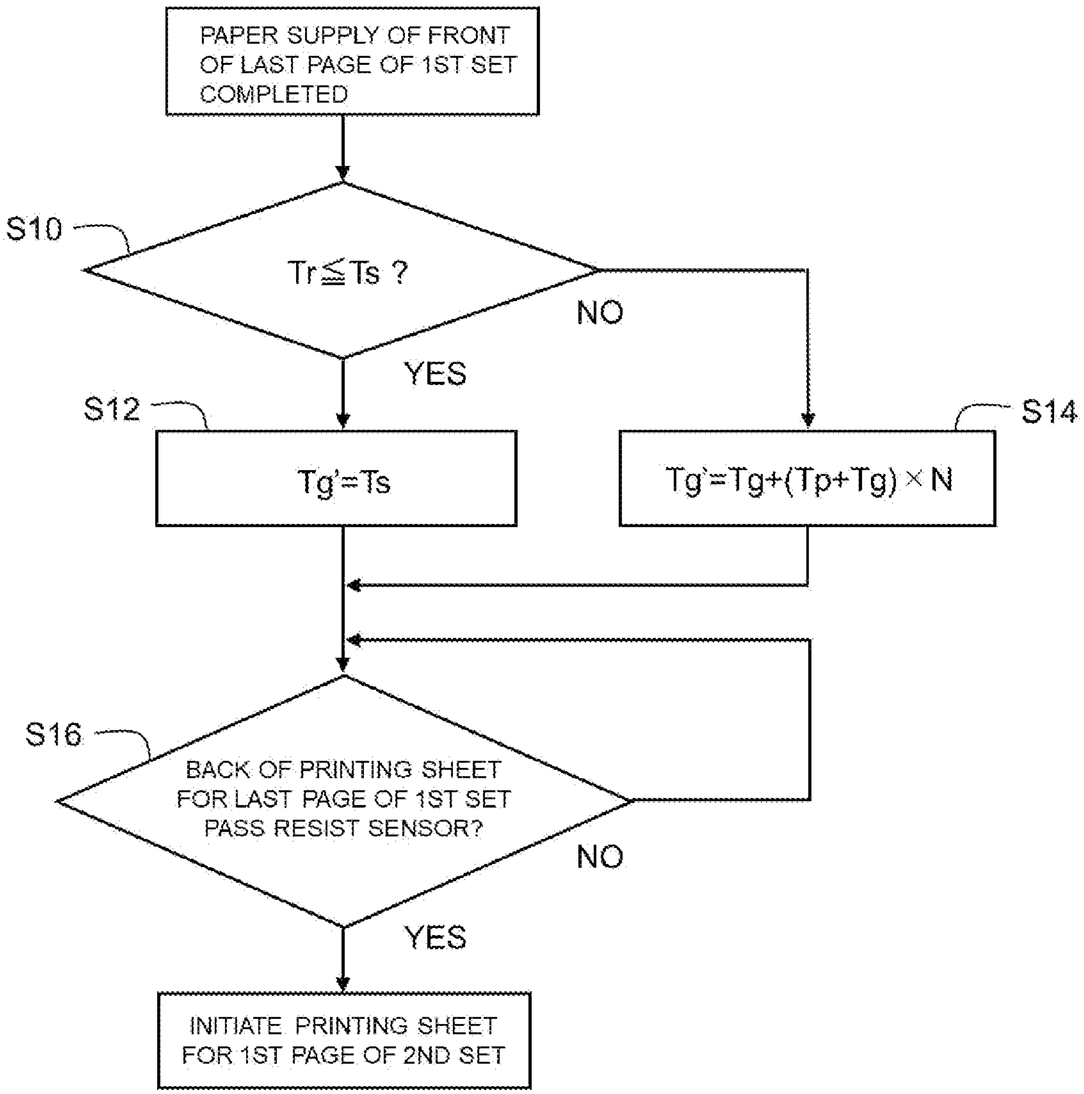
FIG. 9 is a flow chart for explaining a modification of the method for determining the paper supply timing of the first sheet of a second set of sheets.

Therefore, as outlined in the flow chart illustrated in FIG. 9, after setting the paper supply interval Tg', the control unit 28 judges whether the printing sheet for the last page of the first set of sheets (back of 10th page) has passed the position of the resist sensor 27 based on the detection signal detected by the resist sensor 27 illustrated in FIG. 1 (S16).

Then, in the example illustrated in FIG. 6, for example, if the printing sheet for the last page of the first set of sheets (back of 10th page) has not passed the position of the resist sensor 27 at a point in time that paper supply interval Tg' has elapsed (S16: NO), the control unit 28 waits until the printing sheet passes the position of the resist sensor 27.

Figure 10:
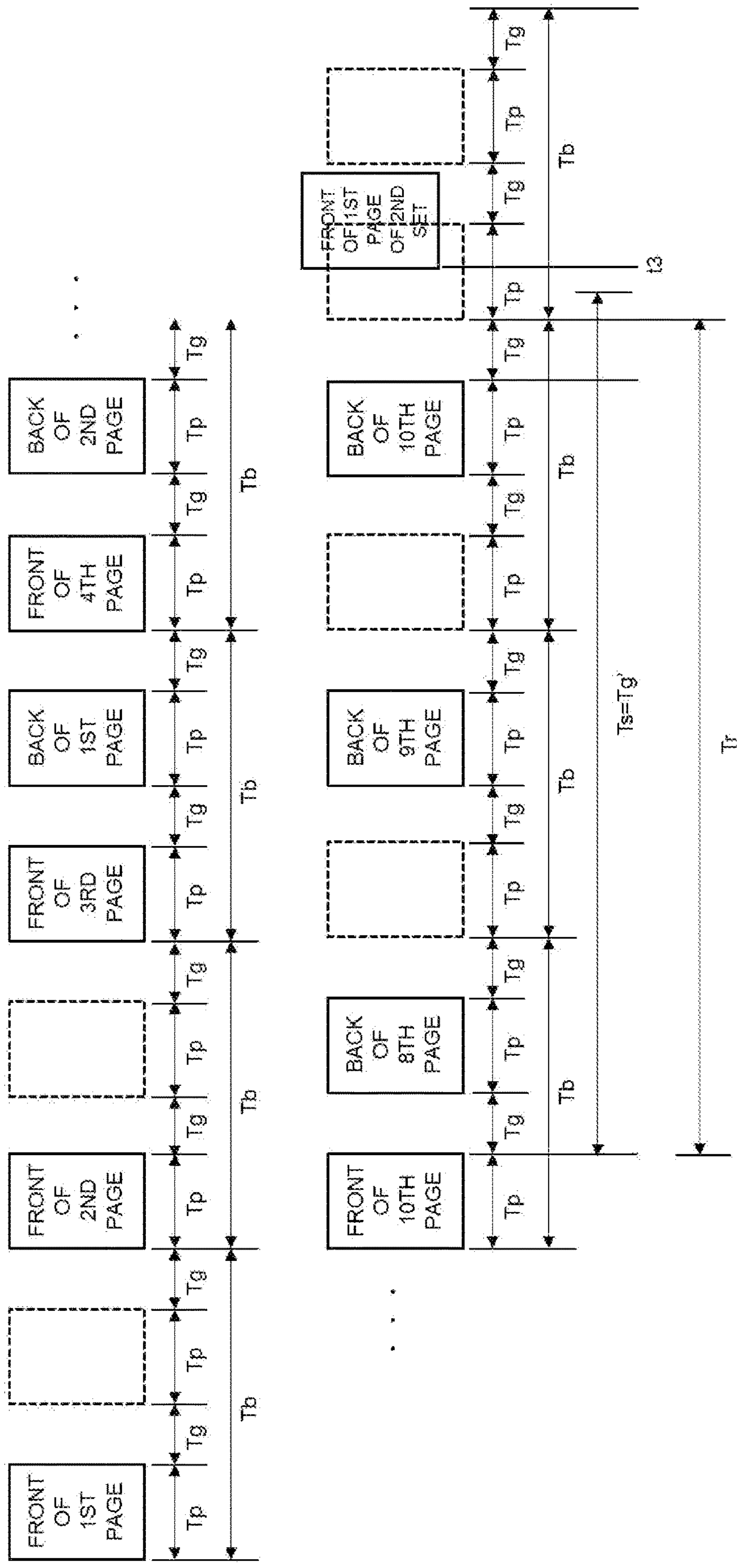
FIG. 10 is a diagram for explaining an example of a method for determining the paper supply timing of the first sheet of a second set of sheets based on a detection result of a resist sensor.

Next, as illustrated in FIG. 10, the control unit 28 causes the paper supply unit 23 to supply a printing sheet for the first page of the second set of sheets at a point in time t3 at which the last page of the first set of sheets (back of 10th page) has not passed the position of the resist sensor 27 (S16: YES).

Meanwhile, in the case that the printing sheet for the last page of the first set of sheets (back of 10th page) has passed the position of the resist sensor 27 at the point in time that paper supply interval Tg' has elapsed, the control unit 28 causes the paper supply unit 23 to initiate supply of the printing sheet for the first page of the second set of sheets at the paper supply interval Tg' which was set in step S12 or step S14.

Figure 11:
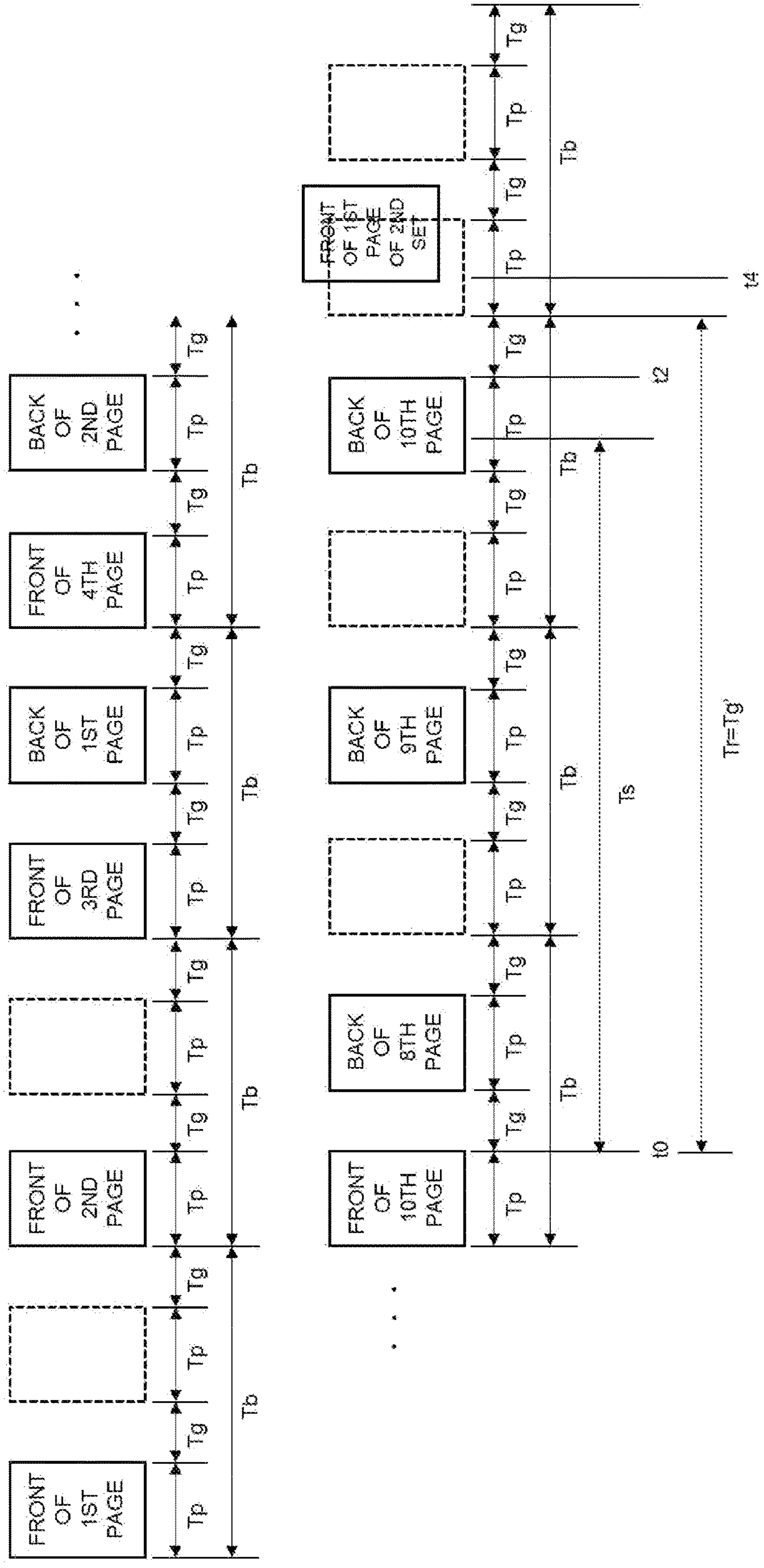
FIG. 11 is a diagram for explaining another example of a method for determining the paper supply timing of the first sheet of a second set of sheets based on a detection result of a resist sensor.
Figure 12:
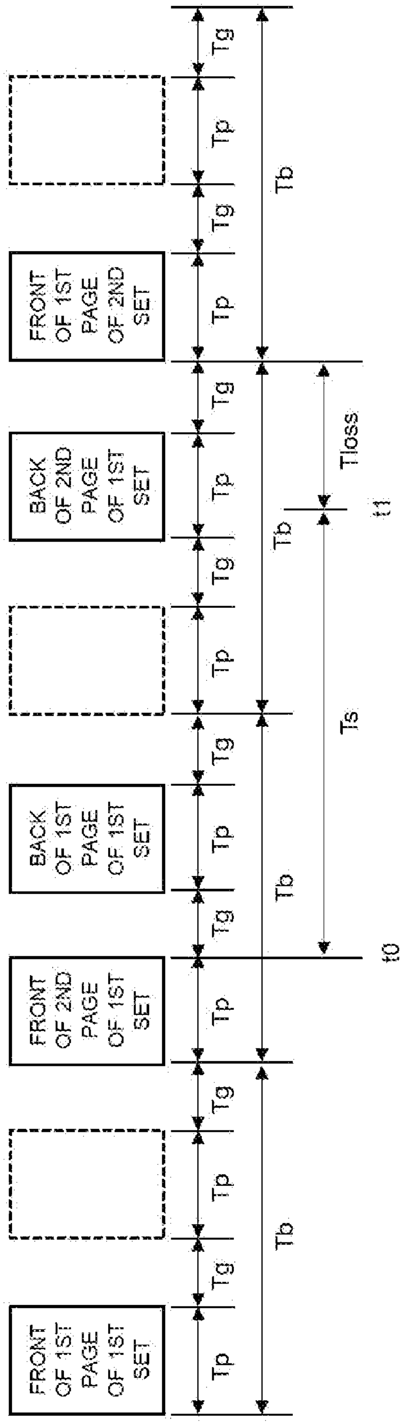
FIG. 12 is a diagram for explaining a conventional paper supply control operation.

Note that FIG. 10 illustrates an example in which the paper supply interval Tg' is set to match the post print process paper supply interval Ts (the case of S12). However, in the case that the paper supply interval Tg' is set to {Tg+(Tp+Tg)·N} as well (the case of S14) as well, the control unit 28 causes the paper supply unit 23 to supply a printing sheet for the first page of the second set of sheets at a point in time t4 at which the last page of the first set of sheets (back of 10th page) has passed the position of the resist sensor 27 (S16: YES), as illustrated in FIG. 11.

As described above, in the case that passage of the printing sheet for the last page of the first set of sheets is not detected by the resist sensor 27 at the point in time at which the paper supply interval Tg' has elapsed, the control unit 28 waits to initiate supply of the print medium for the first page of the second set of print media until after the passage of the print media for the last page is detected. Therefore, collision between the printing sheet for the last page of the first set of sheets and the printing sheet for the first page of the second set of sheets can be more positively avoided.

Note that the embodiment described above is an example in which the double sided printing apparatus of the present disclosure is applied to an ink jet printing apparatus. However, the printing method is not limited to the ink jet method, and the double sided printing apparatus of the present disclosure may be applied to a printing apparatus that employ the laser printing method or the stencil printing method.

The additional features are disclosed with respect to the paper supply device of the present disclosure.

(Additional Features)

In the paper supply device of the present disclosure, the first paper supply interval may be a paper supply interval of the paper supply unit for a case in which double sided conveyance that alternately supplies print media from the paper supply unit and supplies inverted print media is performed, the second paper supply interval may be a paper supply interval that corresponds to an amount of time required for a post print process in the case that the post print process is performed on a first set of sheets of printed print media between printing of the first set of sheets and a second set of sheets to be printed after the first set of sheets, and the third paper supply interval may be a natural number multiple of the first paper supply interval that corresponds to an amount of time from a point in time at which the front of the last page of the first set of sheets passes a predetermined position to a point of time at which the back surface of the print media for the last page of the first set of sheets which has been inverted passes the predetermined position.

The third paper feed interval can be the paper supply interval up to the point below the natural multiple of the first paper supply interval.

In addition, in the paper supply device of the present disclosure, the first paper supply interval may be a paper supply interval of the paper supply unit for a case in which double sided conveyance that alternately supplies print media from the paper supply unit and supplies inverted print media is performed, the second paper supply interval may be a paper supply interval that corresponds to an amount of time required for a post print process in the case that the post print process is performed on a first set of sheets of printed print media between printing of the first set of sheets and a second set of sheets to be printed after the first set of sheets, and the third paper supply interval may be a natural number multiple of the first paper supply interval that corresponds to an amount of time from a point in time at which the front of the last page of the first set of sheets passes a predetermined position to a point of time at which the back surface of the print media for the last page of the first set of sheets which has been inverted passes the predetermined position, and the control unit may cause the paper supply unit to perform paper supply at the third paper supply interval in the case that the second paper supply interval is shorter than the third paper supply interval.

Further, the paper supply device of the present disclosure may be equipped with a detecting unit that detects whether a print medium is passing a predetermined position, and in the case that a second set of sheets is to be printed after printing a first set of sheets and a print medium for a first page of the second set of sheets is supplied at a second paper supply interval, the control unit controls paper supply of the print medium for the first page of the second set of sheets such that the paper supply of the print medium for the first page of the second set of sheets is initiated after waiting for a print medium for the last page of the first set of sheets to be detected, in the case that the print medium for the last page of the first set of sheets is not detected by the detecting unit at a point in time at which the second paper supply interval has elapsed.

What is claimed is:

1. A paper supply device, comprising:

a paper supply unit that sequentially supplies a plurality of print media; and a control unit that controls the paper supply unit, wherein the plurality of print media are sequentially supplied at a first paper supply interval, the control unit sets a second paper supply interval in advance that is longer than the first paper supply interval, and the control unit compares a third paper supply interval, based on a point in time which is a natural number multiple of the first paper supply interval, and the second paper supply interval, and causes the paper supply unit to supply paper at the second paper supply interval in response to the comparing operation determining that the second paper supply interval is greater than or equal to the third paper supply interval.

2. The paper supply device as defined in claim 1, wherein:

the first paper supply interval is a paper supply interval of the paper supply unit for a case in which double sided conveyance that alternately supplies print media from the paper supply unit and supplies inverted print media is performed;

the second paper supply interval is a paper supply interval that corresponds to an amount of time required for a post print process in the case that the post print process is performed on a first set of sheets of printed print media between printing of the first set of sheets and a second set of sheets to be printed after the first set of sheets; and the third paper supply interval is a natural number multiple of the first paper supply interval that corresponds to an amount of time from a point in time at which the front of the last page of the first set of sheets passes a predetermined position to a point of time at which the back surface of the print media for the last page of the first set of sheets which has been inverted passes the predetermined position.

3. The paper supply device as defined in claim 1, wherein:

the first paper supply interval is a paper supply interval of the paper supply unit for a case in which double sided conveyance that alternately supplies print media from the paper supply unit and supplies inverted print media is performed;

the second paper supply interval is a paper supply interval that corresponds to an amount of time required for a post print process in the case that the post print process is performed on a first set of sheets of printed print media between printing of the first set of sheets and a second set of sheets to be printed after the first set of sheets; and the third paper supply interval is a natural number multiple of the first paper supply interval that corresponds to an amount of time from a point in time at which the front of the last page of the first set of sheets passes a predetermined position to a point of time at which the back surface of the print media for the last page of the first set of sheets which has been inverted passes the predetermined position, and the control unit causes the paper supply unit to perform paper supply at the third paper supply interval in the case that the second paper supply interval is shorter than the third paper supply interval.

4. The paper supply device as defined in claim 1, further comprising:

a detecting unit that detects whether a print medium is passing a predetermined position, wherein:

a second set of sheets is to be printed after printing a first set of sheets and a print medium for a first page of the second set of sheets is supplied at the second paper supply interval, and the control unit controls paper supply such that supply of the print medium for the first page of the second set of sheets is initiated after waiting for a print medium for the last page of the first set of sheets to be detected, in response to the detecting unit not detecting that the print medium for the last page of the first set of sheets at a point in time at which the second paper supply interval has elapsed.

5. A paper supply device, comprising:

a paper supply unit that sequentially supplies a plurality of print media; and a control unit that controls the paper supply unit, wherein the plurality of print media are sequentially supplied at a first paper supply interval, the control unit sets a second paper supply interval in advance that is longer than the first paper supply interval, and the control unit compares a third paper supply interval, based on a point in time which is a natural number multiple of the first paper supply interval, and the second paper supply interval, and causes the paper supply unit to supply paper at the second paper supply interval in response to the comparing operation determining that the second paper supply interval and the third paper supply interval are different.

* * * * *